United States Patent Office 3,015,495
Patented Jan. 2, 1962

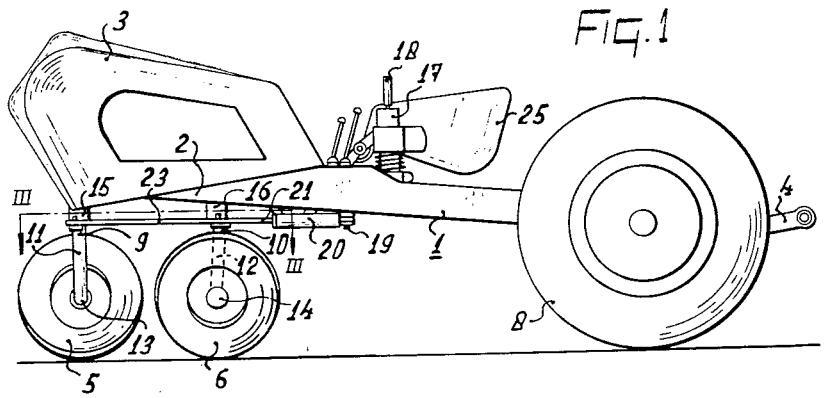
FIG. 1
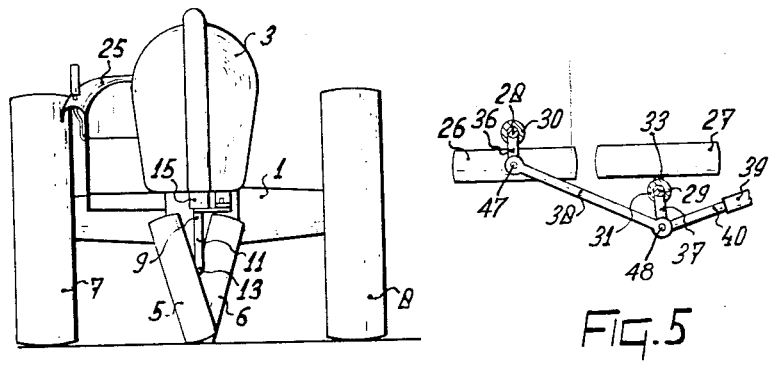
FIG. 2
FIG. 5
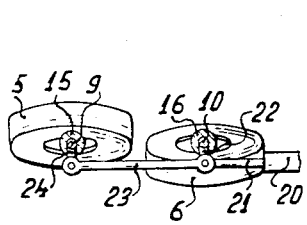
FIG. 3
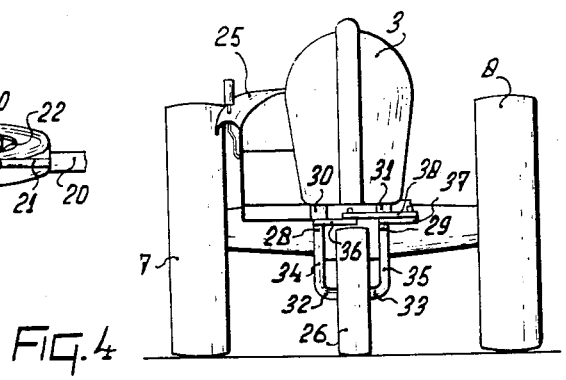
FIG. 4

3,015,495
AGRICULTURAL TRACTOR HAVING TWO
TANDEM STEERING WHEELS
Cornelis van der Lely and Ary van der Lely, Maasland,
Netherlands, assignors to C. van der Lely N.V., Maasland, Netherlands, a Dutch limited company
Filed Oct. 8, 1958, Ser. No. 766,009
Claims priority, application Netherlands Oct. 10, 1957
3 Claims. (Cl. 280—87)

This invention relates to agricultural tractors of the type having a frame and two steerable ground wheels constituting either the front or rear wheels of the tractor. In known tractors of this type, the two steerable wheels are positioned side by side, either in remote relation, one on each side of the tractor, or in close relation, one on each side of a vertical pivotal shaft.

The advantage of employing two closely arranged wheels at the front of a tractor is that there is then sufficient free space at the front of the tractor to permit the easy fastening of agricultural implements thereto.

Moreover, there is the additional advantage that the tractor may be used in fields having plants in rows with less danger of damaging the plants. This construction, has however, the disadvantage that, particularly in rainy weather, earth is likely to lodge between the closely spaced wheels, which can give rise to difficulties in driving. An object of the invention is to obviate this disadvantage, while retaining the other indicated advantages.

In accordance with the invention there is provided an agricultural tractor having a frame and two steerable ground wheels constituting either the front or rear wheels thereof, wherein the steerable wheels are located one behind the other and are each turnable for steering purposes about a respective substantially vertical shaft carried by the frame of the tractor. When making steering movements with a tractor according to the invention the planes of the steerable wheels will turn relatively to each other, so that any earth trapped between these wheels will be dislodged.

For a better understanding of the invention, reference will now be made to the accompanying drawings, in which:

FIGURE 1 is a side elevational view of an agricultural tractor according to the invention, FIGURE 2 is a front view of the tractor shown in FIGURE 1, FIGURE 3 is a sectional plan view taken on line III—III of FIGURE 1, FIGURE 4 is a front view of a further embodiment of a tractor according to the invention, and FIGURE 5 is a plan view of a detail of the tractor shown in FIG. 4.

Referring first to FIGS. 1 to 3, the tractor comprises a frame 1 which has at the front end 2, an engine (not shown) arranged beneath a bonnet 3, and at the rear end a lifting device 4. The frame 1 is supported at the front end on two steerable ground wheels 5 and 6, arranged one behind the other, and at the rear end on two engine-driven ground wheels 7 and 8. The steerable wheels 5 and 6 are inclined to the vertical in different directions so that they are relatively canted as seen best in FIG. 2. Stated otherwise, wheels 5 and 6 define two planes which, with these wheels positioned as in FIG. 2, constitute an inverted dihedron having its apex substantially at the level of the ground traversed because the planes intersect the ground along a common line. When, however, these wheels are turned, the planes intersect the ground along spaced parallel lines and then constitute an inverted dihedron whose apex is below ground level. The rotary axles 13 and 14 of the ground wheels 5 and 6 are connected with vertical shafts 9 and 10 by means of bars 11 and 12, the bar 11 being located on the left-hand side of the ground wheel 5 and the bar 12 on the right-hand side of the ground wheel 6. The vertical shafts 9 and 10 are journalled in bearings 15 and 16 carried on the frame 1 and disposed centrally over their respective ground wheels 5 and 6, and hence over those surfaces of these wheels which are in contact with the ground, so that the shafts 9 and 10 are readily turnable in these bearings. The bearings 15 and 16 are arranged one behind the other in a manner such that a vertical plane passing through the axes of these bearings lies in the direction of travel. By this arrangement of the bearings 15 and 16, the wheel 6 is caused to contact the ground at a location just behind that at which the wheel 5 contacts the ground, so that during straight travel over fields the wheels 5 and 6 make only one track.

For steering the ground wheels 5 and 6, the frame 1 has a steering column 17 provided at the top with a steering device consisting of a lever 18, which can be swung to the left or to the right for steering the wheels 5 and 6. By moving the lever 18, a piston and cylinder mechanism 20, which is pivotable about a vertical shaft 19 and which carries a steering rod 21, is actuated. The steering rod 21 is pivotally connected to an arm 22, which is rigidly attached to the vertical shaft 10. A link 23 connects the rod 21 also to an arm 24, which is rigidly attached to the shaft 9. The steering device is such that, for turning left, when driving in forward direction, the lever 18 is swung to the left, while, for turning right, the lever 18 is swung to the right. When the lever 18 is swung to the left, the mechanism 20 is such as to draw the steering rod 21 towards the shaft 19, so that the wheels 5 and 6 will turn in counterclockwise direction (as seen from above) about their vertical shafts 9 and 10. When the lever 18 is swung to the right, the steering rod 21 will be pushed by the mechanism 20 away from the shaft 19, so that the wheels 5 and 6 will turn about their shafts 9 and 10 in a clockwise direction as viewed from above. The lever 18 can be easily actuated by the driver of the tractor from a seat 25.

FIGURES 4 and 5 are a front view of a tractor and a plan view of a detail thereof respectively, this tractor corresponding substantially with that shown in FIGS. 1 to 3, the steerable wheels being, however, differently arranged. As shown in these figures the tractor has two steerable ground wheels 26 and 27, which are arranged one behind the other and of which the vertical shafts 28 and 29 are rotatably journalled in bearings 30 and 31 secured to the frame of the tractor. These vertical shafts 28 and 29 are, however, not arranged over the centers of the wheels 26 and 27, the shaft 28 being located on the right-hand side of the wheel 26 and the shaft 29 on the left-hand side of the wheel 27. The shafts 28 and 29 are located at a distance above the ground which exceeds the diameter of the wheels 26 and 27.

The rotary axles 32 and 33 of the wheels 26 and 27, which latter are in this embodiment vertical in contradistinction to the previously described wheels 5 and 6, are connected with the vertical shafts 28 and 29 by means of bars 34 and 35. The wheels 26 and 27 are located one behind the other, in the direction of travel so that also in this embodiment the wheels 26 and 27 make only one track during straight travel. Since the wheels are located one behind the other in the same vertical plane, the shafts 28 and 29 are spaced apart in a direction transverse to the longitudinal extent of the tractor. For controlling the wheels 26 and 27, the vertical shafts 47 and 48 are provided with arms 36 and 37, which are coupled together by a link 38, the arm 37 being pivotally connected to a steering rod 40 associated with a mechanism 39 in the same way as the steering rod 21 of the preceding embodiment is associated with the mechanism 19.

By arrangement the steerable ground wheels of an agricultural tractor in the manner described above, much free space is available at the front side of the tractor for attaching agricultural machines thereto, while during travel the earth does not tend to lodge to the same extent between the wheels as it does with tractors having two steerable wheels set close together in side by side relation. Even if some earth does tend to lodge between the wheels 5 and 6 or 26 and 27, such earth will be released when the tractor is driven through a curved path, since when the wheels are turned out of line, the portions thereof which were most adjacent move away from one another.

The canted positions of the steerable wheels, as is shown in the embodiment of FIGS. 1 to 3, may reduce, under certain circumstances, the risk of skidding when turning. A further advantage is that with this arrangement of the steerable wheels these wheels make only one track, during straight travel in contra-distinction to known tractors, wherein two tracks are made so that the tractor of the invention is better suited for use on fields with plants in rows.

What we claim is:

1. An agricultural tractor comprising a frame having front and rear ends and defining a longitudinal axis, a pair of relatively fixed and laterally spaced wheels on said frame at one of said ends, a pair of steerable wheels at the other of said ends and aligned in leading and trailing relationship and adapted to traverse a single path with said tractor moving in a direction parallel to said longitudinal axis, means pivotally coupling said steerable wheels to said frame for movement about spaced vertical axes, and means coupled to said steerable wheels to steer the same, said steerable wheels being inclined in opposite directions and defining wheel planes which with the steerable wheels aligned for forward travel enclose an inverted dihedron having its apex substantially at the level of the ground traversed and which with the steerable wheels turned define an inverted dihedron having its apex beneath said level.

2. A tractor as claimed in claim 1 wherein the first said means comprises vertical shafts on said frame and coupled respectively to said steerable wheels, the second said means comprising operatively associated piston and cylinder members one of which is fixed relative to said frame and the other of which is coupled to said shafts for rotating the same.

3. A tractor comprising a frame having front and rear ends and defining a longitudinal axis, a pair of relatively fixed and laterally spaced wheels on said frame at one of said ends, a pair of steerable wheels at the other of said ends and aligned in leading and trailing relationship and adapted to traverse a single path with said tractor moving in a direction parallel to said longitudinal axis, means pivotally coupling said steerable wheels to said frame for movement about spaced vertical axis, and means coupled to said steerable wheels to steer the same, the first said means comprising vertical shafts respectively coupled to said steerable wheels on opposite sides thereof.

References Cited in the file of this patent

UNITED STATES PATENTS

| | | |
|---|---|---|
| 645,272 | Scheu | Mar. 13, 1900 |
| 655,483 | Graham | Aug. 7, 1900 |
| 1,361,742 | Porter | Dec. 7, 1920 |
| 1,831,140 | Romine et al. | Nov. 10, 1931 |
| 2,015,891 | Greiner et al. | Oct. 1, 1935 |
| 2,096,239 | Geyer | Oct. 19, 1937 |
| 2,205,403 | Frank | June 25, 1940 |
| 2,523,870 | Love | Sept. 26, 1950 |
| 2,702,438 | Ballu | Feb. 22, 1955 |
| 2,755,713 | Harrison | July 24, 1956 |